(12) United States Patent
Li et al.

(10) Patent No.: US 12,367,008 B2
(45) Date of Patent: Jul. 22, 2025

(54) PROCESSING METHOD FOR BOARD WRITING DISPLAY AND RELATED DEVICES

(71) Applicant: Beijing ESWIN Computing Technology Co., Ltd., Beijing (CN)

(72) Inventors: Weiqi Li, Beijing (CN); Yuandong Huang, Beijing (CN); Andy Zhou, Beijing (CN)

(73) Assignee: Beijing ESWIN Computing Technology Co., Ltd., Beijing (CN)

( * ) Notice: Subject to any disclaimer, the term of this patent is extended or adjusted under 35 U.S.C. 154(b) by 270 days.

(21) Appl. No.: 18/090,833

(22) Filed: Dec. 29, 2022

(65) Prior Publication Data

US 2023/0350632 A1 Nov. 2, 2023

(30) Foreign Application Priority Data

Apr. 29, 2022 (CN) .......................... 202210471823.7

(51) Int. Cl.
  *G06F 3/147* (2006.01)
  *G06T 5/70* (2024.01)
  *G06T 11/00* (2006.01)
  *G09G 5/377* (2006.01)

(52) U.S. Cl.
  CPC ................ *G06F 3/147* (2013.01); *G06T 5/70* (2024.01); *G06T 11/001* (2013.01); *G06T 2207/10016* (2013.01); *G06T 2207/10024* (2013.01); *G06T 2207/20081* (2013.01); *G09G 5/377* (2013.01)

(58) Field of Classification Search
  CPC .......... G06F 3/147; G06T 2207/10016; G09G 5/377

See application file for complete search history.

(56) References Cited

U.S. PATENT DOCUMENTS

| 11,562,153 | B1* | 1/2023 | Etwaru | .................... G06F 40/58 |
| 2022/0255974 | A1* | 8/2022 | Berliner | .................. G06T 19/20 |

FOREIGN PATENT DOCUMENTS

| CN | 114202601 A | 3/2022 |
| CN | 114860184 A | 8/2022 |

* cited by examiner

*Primary Examiner* — Matthew Salvucci
(74) *Attorney, Agent, or Firm* — Westman, Champlin & Koehler, P.A.

(57) ABSTRACT

The present disclosure provides a processing method for board writing display and related devices, wherein the processing method includes: acquiring a board writing image to be displayed, wherein the board writing image to be displayed is a board writing image with complete board writing data extracted from an image frame of a video; overlaying the board writing image to be displayed to a writing board area of the image frame according to a display parameter set by a user and generating an image to be displayed based on an overlaid image; replacing the image frame with the image to be displayed for displaying. The present disclosure makes display mode of board writing may be controlled, and is comparatively intelligent.

10 Claims, 2 Drawing Sheets

PROCESSING METHOD FOR BOARD WRITING DISPLAY AND RELATED DEVICES

CROSS-REFERENCE TO RELATED APPLICATION

This application claims priority to the Chinese Patent Application No. 202210471823.7, filed on Apr. 29, 2022, entitled "processing method for board writing display and related devices", and published as CN114942742A on Aug. 26, 2022, which is incorporated herein by reference in its entirety in the present disclosure.

BACKGROUND OF THE DISCLOSURE

Field of Technology

The present disclosure relates to a field of video processing technology, and in particular, to a processing method for board writing display and related devices.

Description of the Related Art

With universal and popularization of online classes, a teaching video become an indispensable educational resource. The teaching video is obtained by shooting a teaching scene by a camera. A current processing method for the teaching video may only display images of board writing in a single mode in image frames, and board writing display is not intelligent enough.

SUMMARY

In view of the above problems, the present disclosure provides a processing method for board writing display and related devices, including:
  acquiring a board writing image to be displayed, wherein the board writing image to be displayed is a board writing image with complete board writing data extracted from an image frame of a video;
  overlaying the board writing image to be displayed to a writing board area of the image frame according to a display parameter set by a user and generating an image to be displayed based on an overlaid image;
  replacing the image frame with the image to be displayed for displaying.

Optionally, the display parameter comprises a preset color, and overlaying the board writing image to be displayed to the writing board area of the image frame according to display parameters set by the user comprises:
  adjusting a writing color of the board writing image to be displayed to the preset color;
  overlaying an adjusted board writing image to be displayed to the writing board area of the image frame.

Optionally, the board writing image to be displayed is a gray scale image, in which writing and background have a set contrast;
  adjusting the writing color of the board writing image to be displayed to the preset color comprises: converting the board writing image to be displayed into a three-channel image, and adjusting a pixel value of the writing in each channel in the three-channel image into a pixel value of the channel with the preset color.

Optionally, overlaying the adjusted board writing image to be displayed to the writing board area of the image frame comprises: overlaying the adjusted writing image to be displayed with an edge smoothing process of writing to the writing board area of the image frame.

Optionally, the display parameter comprises different transparency parameters, and overlaying the board writing image to be displayed to the writing board area of the image frame according to display parameters set by the user comprises:
  performing transparent processing on the board writing image to be displayed and a writing board image cut out from the image frame by use of the different transparency parameters, and overlaying processed images to obtain a composite writing board image.

Optionally, the display parameter further comprises a flag, and overlaying the board writing image to be displayed to the writing board area of the image frame according to display parameters set by the user further comprises:
  overlaying the image to be displayed or the composite writing board image to the writing board area of the image frame according to the flag.

Optionally, further comprising: setting a value of the flag to another value when receiving a switching signal.

Optionally, the display parameter further comprises instructions for indicating a window display content, wherein,
  in a condition that the instruction indicates that the window display content is a whole image, determining an image in which the writing board area is replaced with the image frame of the composite writing board image as the image to be displayed;
  in a condition that the instruction indicates that the window display content is the writing board area, determining the composite writing board image as the image to be displayed.

According to a second aspect of the present disclosure, there is provided an electronic device, comprising: processor, memory and program stored in the memory and executable on the processor, the program implements the steps of the method according to any of the first aspects According to a third aspect of the present disclosure, there is provided a computer readable storage medium, wherein the computer readable storage medium stores computer program configured to implement the steps of the method according to any of the first aspects.

Beneficial effects of the present disclosure:
  according to the processing method provided by the disclosure, the board writing image to be displayed is overlaid to the writing board area of the image frame according to the display parameters set by the user, and the image to be displayed is generated based on the overlaid image, so that the image to be displayed is different due to different display parameters set by the user, that is, the image to be displayed is capable of being controlled by the user, and therefore, a display mode of the board writing is diversified, and the board writing display is more intelligent.

It is to be understood that both above general description and following detailed description are exemplary and explanatory only and cannot limit the present disclosure.

DETAILED DESCRIPTION OF THE DISCLOSURE

To facilitate an understanding of the present disclosure, the present disclosure will now be described more fully with reference to the accompanying drawings. Preferred embodiments of the present disclosure are set forth in the accompanying drawings. However, the present disclosure may be embodied in different forms and is not limited to the embodiments described herein. Rather, these embodiments are provided so that the present disclosure will be thorough and complete.

Figure 1:
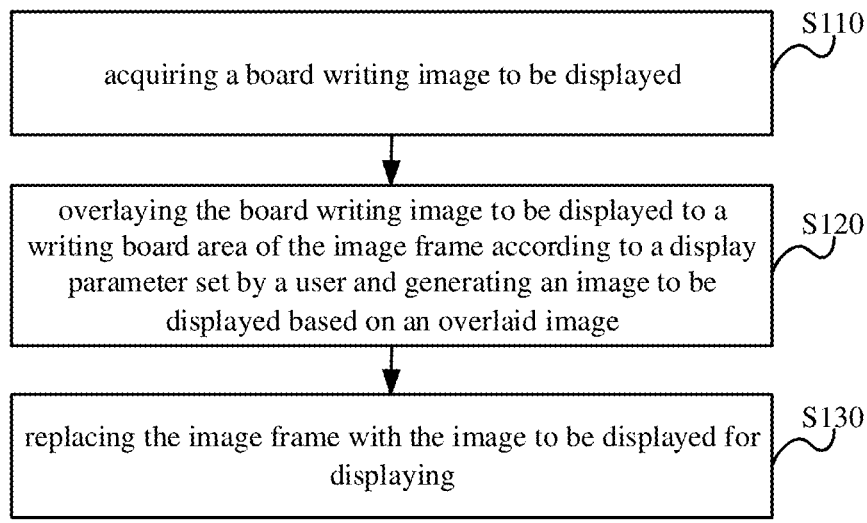
FIG. 1 is a flow chart of a processing method for board writing display provided according to an embodiment of the present disclosure.

FIG. 1 is a flow chart of a processing method for board writing display provided according to an embodiment of the present disclosure. Referring to FIG. 1, the processing method for board writing display includes:

step S110, acquiring a board writing image to be displayed.

Specifically, the board writing image to be displayed is a board writing image with complete board writing data extracted from an image frame of a video, wherein the video is obtained by shooting a scene (such as a teaching scene) in which a writing board exists in reality; the image frame may be an image frame with a writing board placed properly obtained by performing image rectification operation on an original image frame in the video; the board writing image is an image having a specification corresponding to a writing board area in the image frame, but only the board writing data is included in the board writing image.

Figure 2:
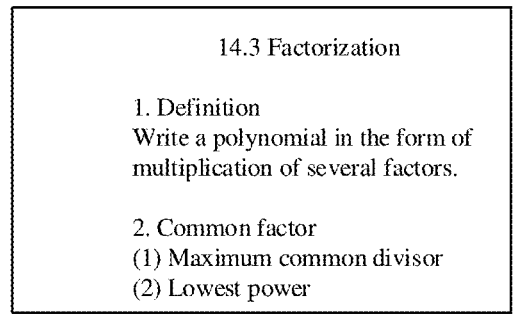
FIG. 2 is an exemplary board writing image to be displayed.

The board writing image extracted by an existing video processing method is a gray image, and background is white and writing is black in the board writing image obtained by binarization processing under general conditions. FIG. 2 is an exemplary board writing image to be displayed, in which a black frame is an additional part for indicating a scope of the board writing image to be displayed, and does not belong to a part of the board writing image to be displayed.

Step S120, overlaying the board writing image to be displayed to the writing board area of the image frame according to a display parameter set by a user and generating an image to be displayed based on an overlaid image.

Specifically, in the embodiment of the present disclosure, overlaying the board writing image to be displayed to the writing board area of the image frame, generally refers to: overlaying the board writing image to be displayed on the writing board area of the image frame as an upper layer of the writing board area of the image frame. After overlaying, the writing board area of the image frame and the image to be displayed form a composite writing board image, and the composite writing board image is the overlaid image.

Step S130, replacing the image frame with the image to be displayed for displaying.

It should be noted that the image to be displayed corresponds to the image frame one to one. A video generally includes a plurality of image frames, and the processing method for board writing display is capable of obtaining images to be displayed corresponding to the image frames in the video.

When the video processed in the above steps S110 to S130 is played to a current image frame, the current image frame is not displayed, but the image to be displayed corresponding to the current image frame is displayed. Generation of the image to be displayed is controlled by the display parameter set by the user, so that the image to be displayed is capable of displaying the board writing in different modes, and the board writing display is intelligent.

The above steps are explained in detail below.

Figure 3:
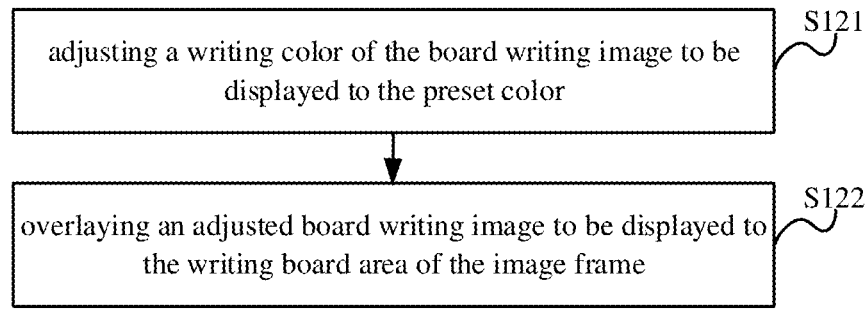
FIG. 3 is a flow chart of a method for overlaying a board writing image to be displayed on a writing board area of an image frame according to a display parameter set by a user.

In an alternative embodiment, the display parameter includes a preset color, and referring to FIG. 3, in step S120, overlaying the board writing image to be displayed to the writing board area of the image frame according to display parameters set by the user includes:

step S121, adjusting a writing color of the board writing image to be displayed to the preset color. The preset color has a pixel value of r in a red channel, a pixel value of g in a green channel, and a pixel value of b in a blue channel.

Step S122, overlaying an adjusted board writing image to be displayed to the writing board area of the image frame.

Specifically, the board writing image to be displayed is a gray scale image in which the writing and the background have different pixel values so as to achieve a set contrast. If the writing has a first pixel value and the background has a second pixel value, then to appear the writing, it may be: the first pixel value is larger than a gray scale threshold value, the second pixel value and a color of the writing board are smaller than the gray scale threshold value; it may also be: the first pixel value is smaller than the gray scale threshold value, the second pixel value and the color of the writing board are larger than the gray scale threshold value. The gray scale threshold is, for example, 127 or 128, so that the first pixel value and the second pixel value correspond to the colors, which are generally referred to dark color and light color.

In some scenes, the writing board is nor a whiteboard or a blackboard, but other colors. In this case, it may be that a gray value of the writing board in the gray scale image of the image frame is compared to the gray scale threshold to determine whether the color of the writing board is greater than or less than the gray scale threshold. Corresponding to a condition that the gray scale threshold is 127 or 128, the gray scale value of the writing board in the gray scale image of the image frame is smaller than the gray scale threshold, and the writing board is generally referred to a dark color board, and is commonly referred to a blackboard and a green board; when the gray value of the writing board in the gray scale image of the image frame is greater than the gray scale threshold, the writing board is generally called a light color board, and is commonly referred to a white board.

It should be noted that if the first pixel value is greater than the grayscale threshold, the board writing image with white background and black writing obtained by the binarization process generally needs to be subjected to an image inversion operation first, and an image obtained by the image inversion operation is the board writing image to be displayed. In this case, the first pixel value of the writing in the board writing image to be displayed is 255 and the second pixel value of the background is 0.

Based on the above, in step S121, adjusting the writing color of the board writing image to be displayed to the preset color includes: converting the board writing image to be displayed into a three-channel image, and adjusting a pixel value of the writing in each channel in the three-channel image into a pixel value of the channel with the preset color.

Following process of adjusting the writing color of the writing image to be displayed to the preset color is respectively explained in detail according to different colors of the writing board:

(1) if the color of the writing board is smaller than the gray scale threshold value, the second pixel value of the background is smaller than the gray scale threshold value, and the first pixel value of the writing is larger than the gray scale threshold value.

In this case, converting the board writing image to be displayed into the three-channel image firstly, that is, the pixel values of pixels related to the writing are: R=first pixel value, G=first pixel value, and B=first pixel value, the pixel values of pixels related to the background are: r=second pixel value, G=second pixel value, and B=second pixel value; then, the pixel value (i.e. the first pixel value) in each channel in the three-channel image greater than the gray scale threshold value is adjusted to a channel pixel value of the preset color, so that the pixel values of the pixels related to the writing are adjusted to R=r, G=g, and B=b, that is, the writing color is adjusted to the preset color, and the color of the pixels related to the background is not changed.

(2) If the color of the writing board is larger than the gray scale threshold value, the second pixel value of the background is larger than the gray scale threshold value, and the first pixel value of the writing is smaller than the gray scale threshold value.

In this case, converting the board writing image to be displayed into the three-channel image firstly, that is, the pixel values of the pixels related to the writing are: R=first pixel value, G=first pixel value, and B=first pixel value, the pixel values of the pixels related to the background are: r=second pixel value, G=second pixel value, and B=second pixel value; then, the pixel value (i.e. the first pixel value) in each channel in the three-channel image smaller than the gray scale threshold value is adjusted to a channel pixel value of the preset color, so that the pixel values of the pixels related to the writing are adjusted to R=r, G=g, and B=b, that is, the writing color is adjusted to the preset color, and the color of the pixels related to the background is not changed.

Exemplarily, the preset color has a pixel value of 0 in the red channel, a pixel value of 255 in the green channel, and a pixel value of 0 in the blue channel, that is, a threshold color is green, and the writing color of the board writing image to be displayed is finally adjusted to green. Taking the board writing image to be displayed shown in FIG. 2 as an example, the board writing data in the image is adjusted from black to green set by the user. In practice, the preset color and the color of the writing board are obviously different, so that clear recognition of writing data is facilitated.

Further, after the writing color of the board writing image to be displayed is adjusted to the preset color in step S121, the step S122 overlays the adjusted board writing image to be displayed to the writing board area of the image frame, which includes: overlaying the adjusted writing image to be displayed with an edge smoothing process of the writing to the writing board area of the image frame, so that an edge of the writing in the image to be displayed is smoother. Specifically, the edge smoothing process may be Gaussian filtering, in which the adjusted board writing image to be displayed is overlaid on the writing board area of the image frame after Gaussian filtering.

In the embodiment, the writing color in the board writing image to be displayed may be defined by the user, so that the writing is not always common white or black, but green or red and the like may be presented according to a preference of the user, interestingness is high, and an interest of the user in watching the video is increased.

In another alternative embodiment, the display parameters include different transparency parameters, and in step S120, overlaying the board writing image to be displayed to the writing board area of the image frame according to display parameters set by the user includes: performing transparent processing on the board writing image to be displayed and a writing board image cut out from the image frame by use of the different transparency parameters, and overlaying processed images to obtain the composite writing board image.

Specifically, a first transparency parameter $\alpha 1$ may be used for performing the transparent processing on the board writing image to be displayed to obtain a transparent board writing image to be displayed; and a second transparency parameter $\alpha 2$ may be used for performing the transparent processing on the writing board image cut out from the image frame to obtain the writing board image after the transparent processing.

The board writing image to be displayed before the transparent processing, may be the board writing image to be displayed without adjusting the writing color; and may also be the board writing image to be displayed after adjusting the writing color, and a specific adjustment process of the writing color may be performing the steps described in the above embodiments according to the preset color set by the user, which is not described herein again.

It should be understood that a transparency of an image ranges from 0 to 1, and thus both the first transparency parameter $\alpha 1$ described above and the second transparency parameter $\alpha 2$ range from 0 to 1. Furthermore, the closer the transparency of the image is to 0, the opaquer the image is, and thus, the closer the first transparency parameter $\alpha 1$ is to 0, the opaquer the board writing image to be displayed after the transparent processing is, that is, the clearer the writing is; conversely, the closer the first transparency parameter $\alpha 1$ is to 1, the more transparent the board writing image to be displayed after the transparent processing is, that is the unclear the writing is.

It should be noted that the composite writing board image is formed by overlaying the writing board image after the transparent processing and the writing board image after the transparent processing, so that a specification of the composite writing board image corresponds to a specification of the writing board area in the image frame. Overlaying the writing board image after the transparent processing and the writing board image after the transparent processing, may refers to: the writing image to be displayed after the transparent processing serves as an upper layer of the writing board image after the transparent processing, and overlies with the writing board image after the transparent processing; may also refers to: the writing board image to be displayed after the transparent processing serves as a lower layer of the writing board image after the transparent processing, and overlies with the writing board image after the transparent processing. For the former case, a value of the first transparency parameter $\alpha 1$ further affects a definition of the writing board image after the transparent processing; for the latter case, a value of the second transparency parameter $\alpha 2$ further affects a definition of the board writing image to be displayed after the transparent processing.

In practice, the user may set the first transparency parameter $\alpha 1$ and the second transparency parameter $\alpha 2$ according to an ambient light of shooting the video and a use requirement of the user.

Further, the first transparency parameter α1 and the second transparency parameter α2 may have a preset relationship, e.g., a sum of the first transparency parameter α1 and a second transparency parameter α2 is 1, in this case the user may set only one of the first transparency parameter α1 and the second transparency parameter α2, and the other is determined by the preset relationship; the first transparency parameter α1 and the second transparency parameter α2 also may have no preset relationship, in this case the user needs to set the first transparency parameter α1 and the second transparency parameter α2 respectively, so that the transparency of the board writing image to be displayed after the transparent processing and the transparency of the writing board image after the transparent processing are set by a user, and is more flexible.

In this embodiment, the writing image to be displayed after the transparent processing serves as an upper layer of the writing board image after the transparent processing, and overlies with the writing board image after the transparent processing, so that an image in which various target objects in the image frame are placed behind the board writing image after the transparent processing may be formed, and thus, the user may view complete content in the image frame. Taking a teaching video as an example, the teaching video includes an image of a teacher or other teaching scenes behind the board writing image after the transparent processing, and since the board writing data is beneficial for the user watching the video to record important knowledge points, and the teacher or other teaching scenes are beneficial to the user watching the video to understand knowledge points carried by the board writing data more representationally, it is very important for the user to watch complete contents in an image frame.

Further, the board writing image to be displayed and the writing board area of the image frame are overlaid after performing the transparent processing, and the transparency parameters of both are set by the user, so that the image to be displayed generated based on the composite writing board image is more intelligent, and may meet a watching requirement of the user.

In another optional embodiment, the display parameters further include a flag, and in step S120, overlaying the board writing image to be displayed to the writing board area of the image frame according to display parameters set by the user further includes: overlaying the image to be displayed or the composite writing board image to the writing board area of the image frame according to the flag.

Specifically, a value of the flag may be a first parameter or a second parameter. In a condition that the flag takes the value as the first parameter, overlaying the board writing image to be displayed to the writing board area of the image frame, since the board writing image to be displayed is opaque, the board writing is in a board writing materialized state; in a condition that the flag takes the value as the second parameter, overlaying the composite writing board image to the writing board area of the image frame, the board writing is in a board writing transparency state. Above overlaying the board writing image to be displayed after the transparent processing to the writing board image after the transparent processing may be performed when the flag is set as the second parameter.

In practice, the two values of the flag may be two logical values, for example, the first parameter is a logical value "false" and the second parameter is a logical value "true". The flag may be represented by a signal, which is generally at a high level for indicating flag is true and at a low level for indicating flag is false.

Further, the value of the flag may be determined by a switching signal input by the user, and the switching signal input by the user is capable of reassigning the flag. The processing method for board writing display further includes: when receiving the switching signal, setting the value of the flag to another value, that is, in a condition that the value of the flag is the first parameter, if the switching signal input by the user is received, converting the value of the flag from the first parameter to the second value; and in a condition that the value of the flag is the second parameter, if the switching signal input by the user is received, converting the value of the flag from the second parameter to the first value. The switching signal realizes a switching control function of a transparent state and a materialized state of the board writing by reassigning the flag.

Further, a certain keyboard key or mouse key may be served as an input button of the switching signal. The following description will take an example in which a space bar is served as the input button of the switching signal. When the space bar is pressed to enable the flag to be false, the switching signal is input by the space bar and is to realize switching from the transparent state of the board writing to the materialized state of the board writing; when the space bar is pressed enable the flag to be true, another switching signal is input by the space bar and is to realize switching from the materialized state of the board writing to the transparent state of the board writing.

In the embodiment, in a condition that the flag takes the value as the first parameter, an opaque board writing image to be displayed is overlaid to the writing board area of the image frame; and in a condition that the flag takes the value as the second parameter, the composite writing board image is overlaid to the writing board area of the image frame. Therefore, the user realizes a control of materialization and transparency of the board writing by controlling the value of the flag, and function of the board writing display is further diversified.

Figure 4:
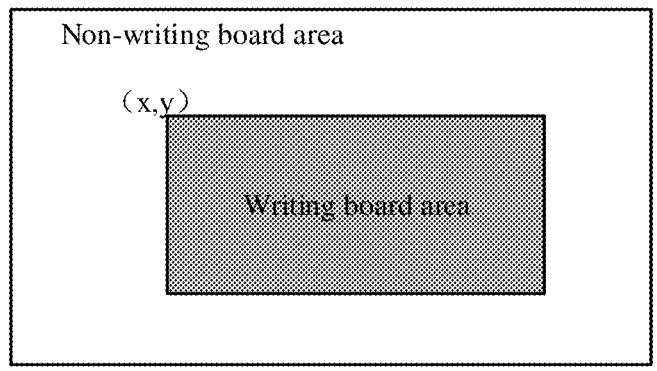
FIG. 4 is a schematic diagram of a composite image frame.

FIG. 4 is a schematic diagram of a composite image frame. The composite image frame refers to an image in which the writing board area is replaced with the composite writing board image. Referring to FIG. 4, a coordinates of an upper left corner of the composite image frame are (0, 0) and a coordinate of an upper left corner of the writing board area in the composite image frame is (x, y), that is, the composite image frame would include the writing board area and a non-writing board area surrounding the writing board area. In view of this, in yet another alternative embodiment, the display parameters further include an instruction for indicating a window display content, in a condition that the instruction indicates that the window display content is a whole image, determining the image (e.g. the composite image frame) in which the writing board area is replaced with the image frame of the composite writing board image as the image to be displayed; in a condition that the instruction indicates that the window display content is the writing board area, determining the composite writing board image as the image to be displayed.

Specifically, the composite writing board image is an image that is no longer located in the image frame and is positionally related to the image frame. In this case, if the instruction indicates that the window display content is the writing board area, the image to be displayed may be obtained without processing the composite writing board image; if the instruction indicates that the window display content is the whole image, the composite writing board image and the image frame of a cut writing board image need to be spliced, so that generating the image in which the writing board area is replaced with the composite writing board image, that is, acquiring the image to be displayed.

In this embodiment, the instruction indicates that the window display content is the whole image or the writing board area, and the instruction is set by the user, so that the window is capable of displaying different content under control of the user. In a condition that the instruction indicates that the window display content is the writing board area, determining the composite writing board image as the image to be displayed, and finally, in step S130, replacing the image frame with the composite writing board image for displaying, so that a student watching the teaching video may focus attention on the composite writing board image.

Figure 5:
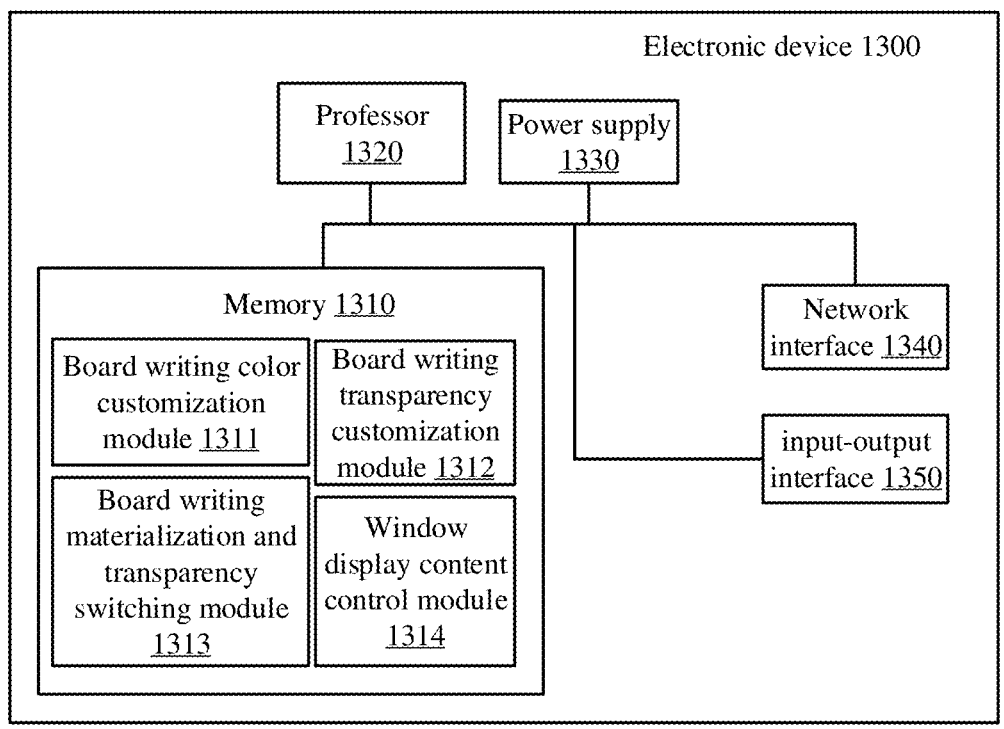
FIG. 5 is a schematic structural diagram of an electronic device provided according to an embodiment of the present disclosure.

The embodiment of the present disclosure further provides an electronic device 1300, as shown in FIG. 5, which includes a memory 1310, a processor 1320, and a program stored in the memory 1310 and executable on the processor 1320, and when the program is executed by the processor 1320, the program is capable of implementing each process of each embodiment of the processing method for board writing display, and is capable of achieving the same technical effect.

Specifically, the program may include at least one of the following functional modules according to functions: a board writing color customization module 1311, a board writing transparency customization module 1312, a board writing materialization and transparency switching module 1313 and a window display content control module 1314, wherein the board writing color customization module 1311 is configured to adjust the writing color of the board writing image to be displayed according to the preset color set by the user, and the board writing transparency customization module 1312 is configured to generate the composite writing board image according to the first transparency parameter α1 and the second transparency parameter α2 set by the user. The board writing materialization and transparency switching module 1313 is configured to implement a switching control function for the board writing transparency state and the board writing materialization state according to the flag set by the user, and the window display content control module 1314 is configured to control the window display content according to the instruction set by the user. The specific method of the functions implemented by these four modules has been described in the above embodiments, and in order to avoid repetition, the four modules are not described in detail here. It should be understood that all four modules may be made into a plug-in library so as to be called by a required user and a required software and hardware platform in the form of the plug-in library.

Of course, the electronic device may also include auxiliary sub-devices such as a power supply 1330, a network interface 1340, and an input-output interface 1350.

It will be understood by those skilled in the art that all or part of the steps of the methods of the above embodiments may be performed by instructions or by instructions controlling associated hardware, and the instructions may be stored in a computer readable storage medium and loaded and executed by a processor. To this end, the disclosed embodiments also provide a computer readable storage medium, on which a computer program is stored, and when the computer program is executed by a processor, the computer program can implement the processes of the embodiments in the processing method for board writing display. The computer readable storage medium may be a USB disk, a removable hard disk, a Read-Only Memory (ROM), a Random Access Memory (RAM), a magnetic disk, or an optical disk, which can store program codes.

Since the program stored in the readable storage medium can execute the steps in any processing method for board writing display provided by the embodiments of the present disclosure, the beneficial effects that can be achieved by any processing method for board writing display provided by the embodiments of the present disclosure can be achieved, and detailed descriptions are omitted here for the details, see the foregoing embodiments. The above operations can be implemented in the foregoing embodiments, and are not described in detail herein.

It should be noted that, in the description of the embodiments, the differences from the other embodiments are emphasized, and the same or similar parts between the embodiments can be understood by referring to each other. For system embodiments, because they are substantially similar to method embodiments, reference is made to the description of the method embodiments in this section for their relevance.

Further, it is noted that in the apparatus and method of the present disclosure, it is apparent that each component or each step may be decomposed and/or recombined. These decompositions and/or recombinations are to be considered equivalents of the present disclosure. Also, the steps of performing the series of processes described above may naturally be performed chronologically in the order described, but need not necessarily be performed chronologically, and some steps may be performed in parallel or independently of each other. It will be understood by those of ordinary skill in the art that all or any of the steps or components of the methods and apparatus of the present disclosure may be implemented in any computing device (including processors, storage media, etc.) or network of computing devices, in hardware, firmware, software, or any combination thereof, which can be implemented by those of ordinary skill in the art using their basic programming skills after reading the description of the present disclosure.

Finally, it should be noted that: it should be understood that the above examples are only for clearly illustrating the present disclosure, and are not intended to limit the embodiments. Other variations and modifications will be apparent to persons skilled in the art in light of the above description. And are neither required nor exhaustive of all embodiments. And obvious variations or modifications of the present disclosure as herein taught are within the scope of the present disclosure.

What is claimed is:

1. A processing method for board writing display, comprising:
   acquiring a board writing image to be displayed, wherein the board writing image to be displayed is a board writing image with complete board writing data extracted from an image frame of a video;
   overlaying the board writing image to be displayed to a writing board area of the image frame according to a display parameter set by a user and generating an image to be displayed based on an overlaid image;
   replacing the image frame with the image to be displayed for displaying,
   wherein the display parameter comprises a flag, and overlaying the board writing image to be displayed to the writing board area of the image frame according to display parameters set by the user further comprises:
   overlaying the image to be displayed to the writing board area of the image frame according to the flag.

2. The processing method according to claim 1, wherein the display parameter comprises a preset color, and overlaying the board writing image to be displayed to the writing board area of the image frame according to display parameters set by the user comprises:
   adjusting a writing color of the board writing image to be displayed to the preset color;
   overlaying an adjusted board writing image to be displayed to the writing board area of the image frame.

3. The processing method according to claim 2, wherein the board writing image to be displayed is a gray scale image, in which writing and background have a set contrast;
   adjusting the writing color of the board writing image to be displayed to the preset color comprises: converting the board writing image to be displayed into a three-channel image, and adjusting a pixel value of the writing in each channel in the three-channel image into a pixel value of the channel with the preset color.

4. The processing method according to claim 2, wherein overlaying the adjusted board writing image to be displayed to the writing board area of the image frame comprises: overlaying the adjusted writing image to be displayed with an edge smoothing process of writing to the writing board area of the image frame.

5. The processing method according to claim 1, wherein the display parameter further comprises different transparency parameters, and overlaying the board writing image to be displayed to the writing board area of the image frame according to display parameters set by the user further comprises:
   performing transparent processing on the board writing image to be displayed and a writing board image cut out from the image frame by use of the different transparency parameters, and
   overlaying processed images to obtain a composite writing board image.

6. The processing method according to claim 5, wherein overlaying the board writing image to be displayed to the writing board area of the image frame according to display parameters set by the user further comprises:
   determining the composite writing board image as the image to be displayed, and overlaying the composite writing board image to the writing board area of the image frame according to the flag.

7. The processing method according to claim 6, further comprising: setting a value of the flag to another value when receiving a switching signal.

8. The processing method according to claim 5, wherein the display parameter further comprises an instruction for indicating a window display content, wherein,
   in a condition that the instruction indicates that the window display content is a whole image, determining an image in which the writing board area is replaced with the image frame of the composite writing board image as the image to be displayed;
   in a condition that the instruction indicates that the window display content is the writing board area, determining the composite writing board image as the image to be displayed.

9. An electronic device, comprising: processor, memory and program stored in the memory and executable on the processor, the program implements the steps of the method according to claim 1 when executed by the processor.

10. A non-transitory computer readable storage medium, wherein the non-transitory computer readable storage medium stores computer program configured to implement the steps of the method according to claim 1 when executed by a processor.

* * * * *